United States Patent
Favero et al.

(10) Patent No.: US 9,469,813 B2
(45) Date of Patent: Oct. 18, 2016

(54) METHOD FOR RECOVERING BITUMEN FROM TAR SANDS

(71) Applicant: S.P.C.M. SA, Andrezieux Boutheon (FR)

(72) Inventors: Cedrick Favero, Saint Romain le Puy (FR); Morgan Tizzotti, Lyons (FR); Nicolas Gaillard, Lyons (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 250 days.

(21) Appl. No.: 14/228,888

(22) Filed: Mar. 28, 2014

(65) Prior Publication Data

US 2014/0311950 A1   Oct. 23, 2014

(30) Foreign Application Priority Data

Apr. 18, 2013  (FR) ...................... 13 53517

(51) Int. Cl.
| | | |
|---|---|---|
| *C10G 1/04* | (2006.01) | |
| *B09B 5/00* | (2006.01) | |
| *B09C 1/00* | (2006.01) | |
| *C08L 29/02* | (2006.01) | |
| *C08L 29/04* | (2006.01) | |
| *C08L 29/06* | (2006.01) | |
| *C08K 5/053* | (2006.01) | |

(52) U.S. Cl.
CPC . *C10G 1/04* (2013.01); *B09B 5/00* (2013.01); *B09C 1/00* (2013.01); *C10G 1/047* (2013.01)

(58) Field of Classification Search
CPC ......... C10G 1/04; C10G 1/047; C08L 29/02; C08L 29/04; C08L 29/06
See application file for complete search history.

(56) References Cited

U.S. PATENT DOCUMENTS

| 4,425,227 | A | 1/1984 | Smith |
|---|---|---|---|
| 4,946,597 | A | 8/1990 | Sury |
| 7,691,260 | B2 | 4/2010 | Caneba |
| 7,931,800 | B2 | 4/2011 | Ozum |
| 2005/0194292 | A1 | 9/2005 | Beetge et al. |
| 2008/0190814 | A1 | 8/2008 | Caneba |
| 2009/0090658 | A1 | 4/2009 | Burkus et al. |
| 2009/0301972 | A1* | 12/2009 | Hines et al. ............ 210/705 |
| 2010/0193404 | A1 | 8/2010 | Yeggy et al. |
| 2011/0114539 | A1 | 5/2011 | Stokes et al. |
| 2012/0222867 | A1 | 9/2012 | Fletcher et al. |
| 2012/0261124 | A1 | 10/2012 | Crabtree et al. |

FOREIGN PATENT DOCUMENTS

| AU | 2008240334 A1 | 5/2009 |
|---|---|---|
| CA | 1293464 C | 12/1991 |
| CA | 2768522 A1 | 8/2012 |
| WO | 2011130109 A2 | 10/2011 |
| WO | 2012008430 A1 | 1/2012 |

OTHER PUBLICATIONS

Stevens, M.P. (1990). Polymer Chemistry, An Introduction. Oxford University Press, 633 pgs [Office action p. 9].*

* cited by examiner

*Primary Examiner* — Brian McCaig

(74) *Attorney, Agent, or Firm* — St. Onge Steward Johnston & Reens, LLC

(57) ABSTRACT

Method for recovering bitumen from tar sands, according to which sands are brought into contact with at least one partially hydrolyzed poly(vinyl acetate) (co)polymer A.

14 Claims, No Drawings

METHOD FOR RECOVERING BITUMEN FROM TAR SANDS

FIELD OF THE INVENTION

The invention relates to the field of the recovery of bitumen from tar sands. The subject of the invention is more specifically a method for enhancing the recovery of bitumen in terms of quality and quantity.

BACKGROUND OF THE INVENTION

It is estimated that at least 1.7 billion barrels of heavy crude oil (also called bitumen) are present in the tar sands of Northern Alberta, in Canada. Tar sands are mixtures of natural origin of sand and/or clay, of water and of oils which are extremely dense and viscous. This bitumen extracted from these tar sands is viscous and solid, or semi-solid, and is difficult to transport since it does not flow easily at temperatures normally encountered in an oil pipeline. Despite these transportation difficulties and the extraction costs, tar sands are widely exploited.

There are various methods for extracting bitumen. Mention may in particular be made of:
- Mining extraction, where, in an open cast mine, the bitumen is recovered by digger-loaders and transported in trucks.
- CSS (Cyclic Steam Stimulation), which consists in using the same well alternating between steam injection and bitumen extraction. The steam liquefies the bitumen and makes pumping possible. The extraction is carried out via injection-pause-production cycles.
- SAGD (Steam Assisted Gravity Drainage), which uses horizontal wells combined in pairs. The upper well constantly injects steam, while the lower well collects the water and the bitumen.
- In situ combustion of the bitumen, which consists in burning the bitumen underground in order to liquefy it and to pump it (THAI process).

In the process by mining extraction, the sand containing the bitumen is milled before being subjected to a conditioning step, called hydro-transport, which initiates the release of the bitumen. In practice, the milled ore is mixed with hot water, generally containing additives such as sodium hydroxide, complexing agents, etc, to create a suspension also referred to as a "slurry", which is then pumped in a pipeline to a processing plant.

In the processing plant, at least one primary separation step is carried out, consisting of a step of flotation by injection of air into the medium.

The primary separation step makes it possible to obtain 3 phases:
- the flotation froth, at the surface of the cell, which contains the majority of the bitumen,
- the middle phase which comprises the rest of the bitumen attached to the inorganic particles which are difficult to separate,
- the bottom, which mainly comprises sand which separates rapidly.

The flotation froth is recovered in order to extract the bitumen therefrom. The middle phase is subjected to a subsequent solid-particle concentration step. The bottom is processed so as to ultimately end up as solid waste.

The objective of the technologies used during the steps for separating the bitumen from its sand is to recover the maximum amount of bitumen in the froth, and to minimize the bitumen residues attached to the inorganic particles both in the middle phase and in the bottom. It is also necessary to limit the amount of particles in the froth which impair the subsequent processing operations.

Those skilled in the art are aware of certain technologies which make it possible to aid the recovery of bitumen during these various steps.

U.S. Pat. No. 4,425,227 uses a light oil, such as kerosene or diesel fuel, as bitumen collector and froth formation aid.

U.S. Pat. No. 4,946,597 claims a process using methyl isobutyl carbinol as conditioning agent for enhancing bitumen flotation. U.S. Pat. No. 7,931,800 describes the use of $Ca(OH)_2$ for reducing the affinity between clay particles and bitumen, thus facilitating the adsorption of bitumen droplets onto air bubbles during the flotation step and resulting in better bitumen recovery yields.

Several patents describe the use of chemical products which have surfactant properties and are capable of facilitating bitumen release from tar sands. For example, patent CA 1293464 describes the combination of a surfactant with a polyethylene oxide in order to increase bitumen recovery yields. Patents AU 2008240334 and US 20090090658 claim the use of proteins or lipids, respectively, and also of chemically modified derivatives thereof with a view to the same results. Patent US 20110114539 reports the use of lignin-based amphiphilic derivatives. Patent U.S. Pat. No. 7,691,260 uses block copolymers composed of an acrylic acid-based hydrophilic part and of a vinyl acetate-based hydrophobic part. Patent US 20100193404 proposes the use of surfactant molecules comprising a phosphate ester function, an aromatic nucleus and a poly(ethylene oxide) oligomer segment).

Patent US 20050194292 describes a method for enhancing the recovery of bitumen from tar sands by adding an agent, an acrylamide-based, anionic water-soluble polymer, capable of sequestering cations. The bitumen is brought into contact with the agent before or during the primary separation of the bitumen and the mineral matter. In a similar perspective, patent WO 2011/130109 uses a combination (i) of a cationic polymer (coagulant) and (ii) of an anionic polymer (dispersant) capable of precipitating clay particles in suspension during the flotation step, thus reducing the solid content in the flotation froth and enhancing bitumen extraction yields.

The pH of the medium during the flotation step is conventionally adjusted to about 8-9 with sodium hydroxide. Patents CA 2768522 and WO 2012/088430 claim complete or partial replacement of the sodium hydroxide via the addition, respectively, of metal (Na or K) carboxylate salts or of cement.

The prior art proposes varied chemistries which, however, are not efficient enough in the face of fine particles. The processing of oxidized or nonoxidized ores, which contain significant concentrations of fines, results in poor froth quality and can potentially impair or prevent subsequent processing operations. Furthermore, some processes use products which are very dangerous to handle.

SUMMARY OF THE INVENTION

The problem addressed by the invention is that of providing a novel process for recovering bitumen from tar sands which makes it possible both to increase the amount of bitumen recovered and also to enhance the quality thereof.

The present invention relates to a novel method for recovering bitumen from tar sands, according to which said sands are brought into contact with at least one partially hydrolyzed poly(vinyl acetate) (co)polymer A.

DETAILED DESCRIPTION OF THE INVENTION

The invention encompasses the following embodiments and any combination thereof.

More specifically, the invention is a method for recovering bitumen from tar sands, comprising:
pre-milling said sands;
forming a suspension by mixing said sands with water;
injecting air into the suspension;
wherein it further comprises contacting the sands with at least one partially hydrolyzed poly(vinyl acetate) (co)polymer A, before and/or during and/or after injecting air.

According to one particular embodiment of the invention, the tar sands result from a mining-extraction, CSS, SAGD or THAI process. Preferentially, the tar sands result from a mining extraction process.

Advantageously, the sands are pre-milled and then mixed with water to form a suspension also referred to as a slurry. Under these conditions, the polymer can be placed in solution in water and then mixed with the sand. In another embodiment, it can be introduced directly into the slurry.

In a subsequent step, air is advantageously injected into the suspension. This injection of air causes flotation of the suspension and creates 3 distinct phases, respectively:
an upper phase,
a middle phase,
a lower phase.

In practice, the bitumen present in the upper phase is separated and then recovered.

As already mentioned, the mixing of the tar sands with the polymer can be carried out once the suspension has been obtained and/or after injection of air into the suspension.

It has been found, surprisingly, that the addition of a hydrolyzed vinyl acetate-based copolymer to the tar sands makes it possible to obtain better recovery of the bitumen, and also a better flotation froth quality.

In practice, the partial hydrolysis of the poly(vinyl acetate) (PVAc) results in polyvinyl alcohol (PVOH) being obtained. More specifically, the PVAc is transesterified, mainly with methanol (methanolysis), in order to obtain PVOH and methyl acetate. The hydrolysis can also be carried out by acid hydrolysis or by basic hydrolysis, thereby making it possible to produce polymers with more or less random tacticity.

The percentage hydrolysis of the poly(vinyl acetate) corresponds to the number of moles of vinyl acetate hydrolyzed (i.e. for which the acetate unit is replaced with an —OH unit) divided by the sum of the number of moles of vinyl acetate hydrolyzed plus the number of moles of vinyl acetate not hydrolyzed. Depending on the percentage of hydrolysis, there is therefore, along the macromolecular chain, a certain proportion of alcohol functions and of ester functions.

In practice, the percentage of hydrolysis of the copolymer A is between 60% and 99%, preferably between 80% and 95%.

According to some embodiments, the polymer A may comprise other ionic and/or non-ionic monomers and therefore form a copolymer. In practice, the monomers are added during the polymerization of the constituent monomers of the poly(vinyl acetate).

The non-ionic monomer(s) which can be used in the context of the invention may be chosen, in particular, from the group comprising water-soluble vinyl monomers. Preferred monomers belonging to this class are, for example, acrylamide, N-isopropylacrylamide and N,N-dimethylacrylamide. Likewise, N-vinylformamide and N-vinylpyrrolidone may be used. A preferred non-ionic monomer is acrylamide.

The cationic monomer(s) which can be used in the context of the invention may be chosen, in particular, from monomers of the acrylamide, acrylic, vinyl, allyl or maleic type which have a quaternary ammonium function. Mention may in particular be made, in a nonlimiting way, of quaternized dimethylaminoethyl acrylate (ADAME), quaternized dimethylaminoethyl methacrylate (MADAME), dimethyldiallylammonium chloride (DADMAC), acrylamidopropyltrimethylammonium chloride (APTAC) and methacrylamidopropyltrimethylammonium chloride (MAPTAC).

The anionic monomer(s) which can be used in the context of the invention may be chosen from a broad group. These monomers may have a function selected from acrylic, vinyl, maleic, fumaric and allyl functionalities and may contain a carboxylic group, a phosphonate group, a phosphate group, a sulfate group, a sulfonate group, or another group with an anionic charge. The monomer may be acid or else in the form of a salt either of an alkaline-earth metal or of an alkali metal corresponding to such a monomer. Examples of suitable monomers include acrylic acid, methacrylic acid, itaconic acid, crotonic acid, maleic acid, fumaric acid and monomers of strong acid type having, for example, a function of sulfonic acid or phosphonic acid type, such as 2-acrylamido-2-methylpropanesulfonic acid, vinylsulfonic acid, vinylphosphonic acid, allylsulfonic acid, allylphosphonic acid, or styrenesulfonic acid, and their water-soluble salts of an alkali metal, of an alkaline-earth metal, and of ammonium.

The polymer A may also comprise hydrophobic monomers having the formula:

R1-R2-R3, wherein:

R1 denotes an unsaturated polymerizable group, preferentially belonging to the vinyl group, such as, without limitation, (meth)vinyl or (meth)allyl. Alternatively, the unsaturated polymerizable group may belong to the (meth)acrylamide or (meth)acrylate groups, or the following groups: hemisters, hemiamides, amide esters, diesters, diamides of an unsaturated acid, such as, without limitation, itaconic acid, maleic acid, crotonic acid, fumaric acid or methylidenemalonic acid.

In the case where R1 is an unsaturated polymerizable amide group, the N atom(s) of the group may be bifunctionalized or trifunctionalized with groups. More specifically, the atom(s) may be functionalized with identical or different R2 groups. With R2, the atom(s) may be functionalized with identical or different R4 groups. An N atom of a monoamide or diamide group may be functionalized in the following ways: NR2R4 or NR2R'2.

In the case where R1 is a diamide, each N may have the form as indicated above, but only one N atom can possibly be functionalized in the following ways: NR4R'4 or NR4R'4R"4.

R2 denotes a single bond or at least one alkylene oxide unit, preferentially comprising 1 to 5 carbons. When R2 has at least 2 different alkylene oxide units, the latter can be distributed randomly, alternately, or in a block.

R3 denotes a linear, branched or cyclic alkyl or arylalkyl chain comprising at least 4 carbons, and optionally comprising at least one S, P, O or N atom, and which may be cationic, anionic, zwitterionic or non-ionic.

R4 denotes an H atom, or a linear, branched or cyclic alkyl or arylalkyl chain comprising at least 1 C, and optionally comprising at least one S, P, O or N atom.

Beside the partially hydrolyzed vinyl acetate monomer, polymer A may therefore comprise at least one cationic monomer, and/or at least one non-ionic monomer, and/or at least one anionic monomer, and/or at least one hydrophobic monomer having the above mentioned R1-R2-R3 formula.

According to another feature of the invention, the copolymer A is preferably brought into contact with the tar sands in a proportion of from 20 g to 10 000 g/T of tar sand, preferably between 100 g and 2000 g/T.

The molecular weight of the copolymer A is in practice between 500 and 200 000, preferably between 1000 and 150 000 g/mol.

Preferably, the copolymer A has a percentage of hydrolysis of between 60% and 95%, advantageously between 80% and 90%, and optionally contains respectively less than 40%, advantageously less than 20%, by weight of a non-ionic, cationic or anionic monomer.

According to some embodiments, the copolymer A may be combined with at least one polymer B and/or at least one polymer C, all different than one another. The polymers may be added separately or as a mixture.

The polymer B may be anionic, amphoteric or zwitterionic and may also have an associative nature. Preferentially, the polymer B is predominantly anionic.

Preferentially, the polymer B is composed of the same ionic and/or non-ionic monomers previously mentioned.

The amount of polymer B is between 1 and 5000 g/T of tar sand, preferably between 5 and 1000 g/T.

The molecular weight of the polymer B is between 200 000 and 35 000 000, preferably between 500 000 and 25 000 000 g/mol.

Preferably, the polymer B is composed of:
30% to 90 mol % of at least one non-ionic monomer,
10% to 70 mol % of at least one anionic monomer,
0 to 15 mol % of at least one cationic monomer.

Preferentially, the polymer C is cationic. The polymer C is composed of the same ionic and/or non-ionic monomers previously mentioned. The following monomers may also be used for the polymer C: epichlorohydrin, dimethylamine, urea-formaldehyde.

The molecular weight of the polymer C is less than 7 000 000, preferably less than 5 000 000 g/mol.

Preferably, the polymer C is composed of:
0 to 60 mol % of at least one non-ionic monomer,
40% to 100 mol % of at least one cationic monomer,
0 to 15 mol % of at least one anionic monomer.

The polymer A is preferentially in the form of a powder or of an aqueous dispersion. The polymers B and C are preferentially in the form of a powder, of an inverse emulsion or of a solution. They can be added in the form of a solution, of a dispersion or as they are.

According to the invention, the polymers may be linear or structured, i.e. star or comb branched. The term "structured polymer" denotes a nonlinear polymer which has side chains.

The polymers used in the invention do not require the development of a particular polymerization process. They can be obtained by all the polymerization techniques well known to those skilled in the art (solution polymerization, direct or inverse suspension polymerization, gel polymerization, precipitation polymerization, (aqueous or inverse) emulsion polymerization optionally followed by a spray drying step, micellar polymerization optionally followed by a precipitation, post-hydrolysis or co-hydrolysis or methanolysis step, template polymerization, radical polymerization or controlled radical polymerization.

The water used in the process may come from recycled water, which comes from water recovered from lakes, surface water or underground water.

Generally, the process water during the separation steps has a temperature of between 10 and 100° C., preferably between 50 and 90° C. The pH of the process water is generally between 6 and 10, preferably between 8 and 9.

The amount of bitumen present in the tar sands is between 3% and 30%, preferably between 5% and 25% in weight as compared to the weight of the tar sand.

As already mentioned, and in a nonlimiting manner, the conditioning of the tar sands is carried out at the location from where the tar sands are taken, in practice the mine. The tar sands are then transported to a processing plant where the actual separation step is carried out. The separation step corresponds to a flotation which makes it possible to separate the suspension into 3 distinct phases, as previously mentioned. The bitumen is recovered in the upper phase denoted "flotation froth". The flotation phenomenon is obtained by injection of air into the suspension.

According to the invention, the (co)polymer A is introduced into the slurry and/or after injection of air. When it is introduced into the suspension, the polymer is advantageously introduced during the transportation of said suspension from the mine to the processing plant.

Advantageously, the middle phase of the suspension is then taken up so as to itself be subjected to an air-injection flotation step.

Optionally, the copolymer may be combined with at least one surfactant known to those skilled in the art. The surfactant may be non-ionic, anionic, cationic or zwitterionic.

Optionally, the copolymer may be combined with at least one chelating agent. Mention may be made, in a nonlimiting manner, of ethylenediaminetetraacetic acid (EDTA), diethylenetriaminepentaacetic acid, ethylenediamine, ethylenediaminetetramethylenephosphonic acid, porphyrin, 2,3-dimercaptopropanol, nitrilotriacetic acid, phosphoric acids, acetic acids, nicotinic acid, pyruvic acid, citric acid, adipic acid, tartaric acid, malonic acid, ascorbic acid, boric acid, sebacic acid, oxalic acid, gluconic acid, imidazole, glycine and polyacrylic acids, in acid or salified form.

Optionally, the copolymer may be combined with at least one solvent. Mention may be made, in a nonlimiting manner, of toluene, xylene, diesel oil, butane, pentane, hexane, heptane, naphtha, benzene, ethanol, 2-butanol, n-butanol, methyl isobutyl carbinol, petroleum ethers, white spirits, dichloroethane, methyl ethyl ketone, trichloroethylene, perchloroethylene, chlorohydrocarbons, or kerosenes (paraffins), alone or in combination.

During the implementation of the method, the copolymer A may optionally be combined with compounds other than the copolymers B and C, known to those skilled in the art.

The invention and the advantages which ensue therefrom will emerge more clearly from the following figures and examples given in order to illustrate the invention in a nonlimiting manner.

EXAMPLES

Composition of the Tar Sand Used

A sample of low-grade tar sand (Alberta Innovates Technology Futures, Edmonton, Canada) is used for these tests. It is composed of 84.7% of solids (clay+sand), 7.2% of bitumen and 8.1% of water. These values are expressed as weight percentages and are determined by extraction with toluene using a Dean-Stark apparatus.

Chemical Composition of the Brine Used

The brine used for the flotation steps is made up of salts and distilled water. The pH is 8.3 and its chemical composition is the following (Table 1):

TABLE 1

| Ions | $Na^+$ | $Ca^{2+}$ | $Mg^{2+}$ | $Cl^-$ | $SO_4^{2-}$ | $CO_3^{2-}$ |
|---|---|---|---|---|---|---|
| ppm | 559 | 44 | 19 | 455 | 202 | 663 |

Equipment and Methods

The tar sand flotation experiments are carried out using a Denver flotation cell (Metso Minerals, Danville, Pa.) according to the experimental protocol described hereinafter.

1/ Conditioning Step:

450 g of tar sand and 300 g of brine at 50° C. are poured into a 2 L rectangular double-layer steel tank. The temperature is kept constant at 50° C. throughout the experiment by continuous circulation of a silicone oil bath through the tank. The brine+tar sand mixture is left under these conditions for 10 min. This mixture is then stirred at 1800 revolutions/min for 5 min under a continuous air stream of 150 mL/min.

2/ First-flotation Step:

After the conditioning step, 550 g of brine at 50° C. are added to the tank and the air stream is stopped. The stirring of the medium is maintained at 1800 revolutions/min for 10 min, during which the bitumen froth formed is recovered in a beaker. Once the stirring has stopped, all the bitumen froth is recovered.

3/ Second-flotation Step:

The stirring at 1800 revolutions/min begins again and is maintained for 5 min under an air stream of 50 mL/min. At the end of this step, all the bitumen froth formed is recovered.

The weight ratios of bitumen and of solid residue for each fraction (froths from the $1^{st}$ and $2^{nd}$ flotation) are determined by extraction with toluene using Dean-Stark apparatuses.

Example 1

A vinyl acetate polymer with a percentage of hydrolysis of 90 mol % and a molecular weight of 15 000 g·mol$^{-1}$ is tested. The polymer is dissolved beforehand in the 300 g of brine which are added during the conditioning step.

As observed in table 2, the bitumen yield without any additive is approximately 76.5% at 50° C. It is observed that the vinyl acetate polymer added in an amount of about 1000 g/metric ton of tar sand makes it possible to increase this yield to 93.8%, i.e. an increase of approximately 18%. It is also observed that PVOH makes it possible to reduce the amount of solid present in the bitumen froth recovered, in particular the $2^{nd}$ flotation froth.

Example 2

The same vinyl acetate polymer as that of example 1 is compared with other chemical additives with regard to the increase in bitumen yield during the various flotation steps. The various additives used were dissolved beforehand in the 300 g of brine.

The compound X corresponds to a poly(acrylamide-co-sodium acrylate) copolymer with an anionicity of 30 mol % and a molecular weight of $10 \times 10^6$ g·mol$^{-1}$.

The compound Y corresponds to a cationic polymer (polyDADMAC) with a molecular weight of 15 000 g·mol$^{-1}$.

$FeCl_3$ is commonly used for water treatment applications as a coagulant.

According to the results of table 2, it is observed that the cationic additives Y and $FeCl_3$ do not have a positive impact on the amount of bitumen recovered during the flotation steps. Worse, their use leads to an appreciable increase in the amount of solid in the bitumen froths recovered. The addition of X during the conditioning step does not make it possible to increase the bitumen extraction yields either.

TABLE 2

| Additive | Amount g/T | Bitumen recovered $1^{st}$ froth | Bitumen recovered $2^{nd}$ froth | Solid/bitumen ratio $1^{st}$ froth | Solid/bitumen ratio $2^{nd}$ froth | Bitumen extraction yield |
|---|---|---|---|---|---|---|
| None | — | 73.5% | 3.0% | 1.9 | 7.3 | 76.5% |
| PVOH | 1000 | 82.4% | 11.4% | 0.8 | 1.2 | 93.8% |
| PVOH | 500 | 79.8% | 1.9% | 1.7 | 4.3 | 81.7% |
| X | 1000 | 63.0% | — | 0.9 | — | 63.0% |
| X | 500 | 65.8% | 8.9% | 2.5 | 3.6 | 74.7% |
| Y | 1000 | 54.2% | 16.8% | 6.6 | 11.6 | 71.0% |
| Y | 500 | 59.6% | 14.0% | 4.4 | 7.8 | 73.3% |
| $FeCl_3$ | 1000 | 58.5% | 10.5% | 3.6 | 5.6 | 69.0% |
| $FeCl_3$ | 500 | 64.8% | 10.4% | 2.5 | 4.3 | 75.2% |

What is claimed is:

1. A method for recovering bitumen from tar sands, comprising the steps of:
   pre-milling said sands;
   forming a suspension by mixing said sands with water;
   injecting air into the suspension; and
   contacting the sands with at least one partially hydrolyzed poly(vinyl acetate) (co)polymer, before and/or during and/or after said step of injecting air.

2. The method of claim 1, wherein the percentage of hydrolysis of the partially hydrolyzed poly(vinyl acetate) (co)polymer is between 60% and 99%.

3. The method of claim 1, wherein the partially hydrolyzed poly(vinyl acetate) (co)polymer also contains at least one non-ionic monomer chosen from the following: acrylamide, N-isopropylacrylamide, N,N-dimethylacrylamide, N-vinylformamide and N-vinylpyrrolidone.

4. The method of claim 1, wherein the partially hydrolyzed poly(vinyl acetate) (co)polymer also contains at least one cationic monomer chosen from the following: quaternized dimethylaminoethyl acrylate (ADAME), quaternized dimethylaminoethyl methacrylate (MADAME), dimethyldiallylammonium chloride (DADMAC), acrylamidopropyltrimethylammonium chloride (APTAC) and methacrylamidopropyltrimethylammonium chloride (MAPTAC).

5. The method of claim 1, wherein the partially hydrolyzed poly(vinyl acetate) (co)polymer also contains at least one anionic monomer chosen from the following: acrylic acid, methacrylic acid, itaconic acid, crotonic acid, maleic acid, fumaric acid, 2-acrylamido-2-methylpropanesulfonic acid, vinylsulfonic acid, vinylphosphonic acid, allylsulfonic acid, allylphosphonic acid and styrenesulfonic acid, and the water-soluble salts thereof of an alkali metal, of an alkaline-earth metal, and of ammonium.

6. The method of claim 1, wherein the amount of partially hydrolyzed poly(vinyl acetate) (co)polymer ranges from 20 g to 10 000 g per ton of tar sand.

7. The method of claim 1, wherein at least one second polymer and/or at least one third polymer are also added separately or as a mixture, and wherein the partially hydrolyzed poly(vinyl acetate) (co)polymer and the second and third polymers are all different from each other.

8. The method of claim 7, wherein the second polymer is composed of:
   30% to 90 mol % of at least one non-ionic monomer,
   10% to 70 mol % of at least one anionic monomer,
   0 to 15 mol % of at least one cationic monomer.

9. The method of claim 7, wherein the third polymer is composed of:
   0 to 60 mol % of at least one non-ionic monomer,
   40% to 100 mol % of at least one cationic monomer,
   0 to 15 mol % of at least one anionic monomer.

10. The method of claim 1, wherein the temperature of the water is between 10 and 100° C.

11. The method of claim 10, wherein the pH of the water is between 6 and 10.

12. The method of claim 1, wherein the tar sands result from a mining-extraction, CSS, SAGD or THAI process.

13. The method according to claim 1, wherein the percentage of hydrolysis of the partially hydrolyzed poly(vinyl acetate) (co)polymer is between 80% and 95%.

14. The method of claim 1, wherein the temperature of the water is between 50 and 90° C., and wherein the pH of the water is between 8 and 9.

\* \* \* \* \*